US006963827B1

(12) United States Patent
Elyea et al.

(10) Patent No.: US 6,963,827 B1
(45) Date of Patent: Nov. 8, 2005

(54) SYSTEM AND METHOD FOR PERFORMING DISCRETE SIMULATION OF ERGONOMIC MOVEMENTS

(75) Inventors: Larry L. Elyea, Centreville, VA (US); John W. Brown, Manassas, VA (US); David J. Aubin, Center Harbor, NH (US); Vance J. Cathell, Fairfax, VA (US)

(73) Assignee: United States Postal Service, Washington, DC (US)

( * ) Notice: Subject to any disclaimer, the term of this patent is extended or adjusted under 35 U.S.C. 154(b) by 751 days.

(21) Appl. No.: 09/675,256

(22) Filed: Sep. 29, 2000

Related U.S. Application Data (60) Provisional application No. 60/156,513, filed on Sep. 29, 1999.

(51) Int. Cl.[7] .............................................. G06F 9/455
(52) U.S. Cl. .......................................... 703/6; 382/128
(58) Field of Search ............................. 703/6; 706/16; 382/128; 128/898; 601/23; 713/600

(56) References Cited

U.S. PATENT DOCUMENTS

| | | | |
|---|---|---|---|
| 4,795,351 A | 1/1989 | Vermette | 434/258 |
| 5,142,622 A | 8/1992 | Owens | 709/227 |
| 5,261,041 A | 11/1993 | Susman | 345/473 |
| 5,303,170 A | 4/1994 | Valko | 703/2 |
| 5,433,223 A | 7/1995 | Moore-Ede et al. | 128/898 |
| 5,446,870 A | 8/1995 | Hinsberg, III et al. | 703/6 |
| 5,649,061 A | 7/1997 | Smyth | 706/16 |
| 5,701,439 A | 12/1997 | James et al. | 703/17 |
| 5,720,711 A | 2/1998 | Bond et al. | 601/23 |
| 5,724,589 A | 3/1998 | Wold | 719/318 |
| 5,774,357 A | 6/1998 | Hoffberg et al. | 713/600 |
| 5,875,108 A | 2/1999 | Hoffberg et al. | 700/17 |
| 5,877,778 A | 3/1999 | Dow et al. | 345/474 |

OTHER PUBLICATIONS

Allen et al., "Application of Virtual Reality Devices to the Quantitative Assessment of Manual Assembly Forces in a Factory Environment," IEEE, vol. 2, pp. 1048–1053 (1995).
Forkey et al., "A Comparison of Thumb and Forearm Muscle Effort Required for Laparoscopic and Open Surgery Using an Ergonomic Measurement Station," IEEE, vol. 4, pp. 1705–1708 (1997).
Khalaf et al., "Biomechanical Simulation of Manual Multi-–Link Coordinated Lifting, " IEEE, pp. 197–198 (1996).
Lee et al., "Force Feedback Using Sensibility Ergonomics Theory in Teleoperation System," IEEE, vol. 1, pp. 597–602 (1999).

*Primary Examiner*—Russell Frejd
(74) *Attorney, Agent, or Firm*—Finnegan, Henderson, Farabow, Garrett & Dunner, L.L.P.

(57) ABSTRACT

A method and apparatus for performing discrete simulation of ergonomic movements that includes a microprocessor to transform a manually performed process into a time-based listing of events, simulate the process and tabulate the results. In addition to a tabular output of the simulation results, the present system provides a graphical representation of a subject performing the simulated tasks together with color-coded depictions illustrating awkward and overly-demanding body movements. Furthermore, an event detector is provided to detect invalid events that may be simulated during verification of the design. The entire process is performed in a manner that minimizes data transfer time between the simulated and graphical portions thereby ensuring that a high level of synchronization is maintained between the simulation of the process and creation of the graphical representation.

17 Claims, 9 Drawing Sheets

EAI Jack Task Anthology
Five-Hour Shift Report - Metabolic Energy Expenditure
USPS DBCS SWEEPER
Job #3287

| Parameters | Duration = 302.89 min | Arm Work = 30% |
|---|---|---|
| Level 2 Tray Lift | Work time <= 8 hr | Body Work = 70% |
| Female, 5'0", 125 lbs | Units = inches, kilograms | Standing = 93%, Bent = 7% |

Task Descriptions

| Task# | kcal | Description | Frequency | Category | Detail | High Pos (m) | Low Pos (m) | Load (kg) | Time (min) | Force (kg) | Walk-speed(m/s) | Distance (m) | Slope(%) |
|---|---|---|---|---|---|---|---|---|---|---|---|---|---|
| 10 | 2.217 | walk | 158 | walks | inclined | - | - | - | 0.00425 | - | - | 13.78 | 0 |
| 20 | 6.173 | raise arms | 160 | lifts | stoop | 28.65 | 62.5 | 0 | - | - | - | - | - |
| 30 | 5.296 | reach to drawer | 160 | arm work - lateral | 90 deg. standing | - | - | 0 | - | - | - | - | - |
| 40 | 5.296 | grasp drawer | 160 | arm work - lateral | 90 deg. standing | - | - | 0 | - | - | - | - | - |
| 50 | 5.296 | pull drawer out | 160 | arm work - lateral | 90 deg. standing | - | - | 0 | - | - | - | - | - |
| 60 | 5.296 | release drawer | 160 | arm work - lateral | 90 deg. standing | - | - | 0 | - | - | - | - | - |
| 70 | 10.000 | reach to DBCS | 160 | arm work - lateral | 180 deg. both hands | - | - | 0 | - | - | - | - | - |
| 80 | 5.296 | grasp letters | 160 | arm work - lateral | 90 deg. standing | - | - | 0 | - | - | - | - | - |
| 90 | 7.314 | lift letters | 160 | arm work - lateral | 90 deg. standing | - | - | 2 | - | - | - | - | - |
| 100 | 4.800 | move letters to 1226 F rack | 160 | arm work - general | light - both arms | - | - | - | 0.25 | - | - | - | - |
| 110 | 5.296 | place letters in letter tray | 160 | arm work - lateral | 90 deg. standing | - | - | 0 | - | - | - | - | - |
| 120 | 5.317 | stand straight | 160 | lowers | stoop | 28.65 | 50.0 | 0 | - | - | - | - | - |
| 130 | 0.358 | raise arms | 17 | lifts | stoop | 27.72 | 33.29 | 0 | - | - | - | - | - |
| 140 | 0.563 | grasp tray | 17 | arm work - lateral | 90 deg. standing | - | - | 0 | - | - | - | - | - |
| 150 | 0.000 | pull tray out | 17 | pushes/pulls | bench height (31.5 in) | - | - | - | - | 22 | - | 16.87 | - |
| 160 | 3.420 | lift tray | 17 | lifts | semi-squat | 29.38 | 51.51 | 11.34 | - | - | - | - | - |
| 170 | 2.465 | place tray | 17 | arm work - lateral | 180 deg. both hands | - | - | 11.34 | - | - | - | - | - |
| 180 | 0.000 | push tray in | 17 | pushes/pulls | chin height (59 in) | - | - | - | - | 22 | - | 14.49 | - |
| 190 | 0.000 | release tray | 17 | arm work - lateral | 180 deg. standing | - | - | 0 | - | - | - | - | - |
| 200 | 0.795 | stand straight | 17 | lowers | stoop | 27.85 | 59.29 | 0 | - | - | - | - | - |
| 210 | 0.147 | raise arms | 7 | lifts | stoop | 27.72 | 33.29 | 0 | - | - | - | - | - |
| 220 | 0.232 | grasp tray | 7 | arm work - lateral | 90 deg. standing | - | - | 0 | - | - | - | - | - |
| 230 | 0.000 | pull tray out | 7 | pushes/pulls | bench height (31.5 in) | - | - | - | - | 22 | - | 16.87 | - |
| 240 | 1.408 | lift tray | 7 | lifts | semi-squat | 29.38 | 51.51 | 11.34 | - | - | - | - | - |
| 250 | 1.015 | place tray | 7 | arm work - lateral | 180 deg. both hands | - | - | 11.34 | - | - | - | - | - |
| 260 | 0.000 | push tray in | 7 | pushes/pulls | chin height (59 in) | - | - | - | - | 22 | - | 14.49 | - |
| 270 | 0.000 | release tray | 7 | arm work - lateral | 180 deg. standing | - | - | 0 | - | - | - | - | - |
| 280 | 0.327 | stand straight | 7 | lowers | stoop | 27.85 | 59.29 | 0 | - | - | - | - | - |
| 290 | 6.828 | raise arms | 177 | lifts | stoop | 28.65 | 62.5 | 0 | - | - | - | - | - |
| 300 | 5.859 | reach to drawer | 177 | arm work - lateral | 90 deg. standing | - | - | 0 | - | - | - | - | - |
| 310 | 5.859 | grasp drawer | 177 | arm work - lateral | 90 deg. standing | - | - | 0 | - | - | - | - | - |
| 320 | 5.859 | pull drawer out | 177 | arm work - lateral | 90 deg. standing | - | - | 0 | - | - | - | - | - |
| 330 | 5.859 | release drawer | 177 | arm work - lateral | 90 deg. standing | - | - | 0 | - | - | - | - | - |

SYSTEM AND METHOD FOR PERFORMING DISCRETE SIMULATION OF ERGONOMIC MOVEMENTS

RELATED APPLICATIONS

The following application is relied upon and are hereby incorporated by reference in this application:

U.S. Provisional Patent Application No. 60/156,513, entitled "System and Method For Performing Discrete Simulation of Ergonomic Movements," filed Sep. 29, 1999.

FIELD OF THE INVENTION

The present invention relates to a system and method for analyzing ergonomic movement, and more particularly to a system and method for combining a discrete simulation capability with an ergonomic analysis tool to provide a system for creating a continuous simulation of a series of user movements for ergonomic analysis over a period of time.

DESCRIPTION OF THE PRIOR ART

Various methods and devices are used to determine the physical strength required and motor skills necessary to perform certain job-related tasks. Such methods and devices are used in human factors engineering analysis to determine specific strength, mobility, and flexibility requirements necessary to perform a particular function, as well as for identifying difficult or impossible positional maneuvering required for the job. These devices are also used to perform injury evaluation related to workman's compensation claims, in rehabilitation exercise, in general exercise and physical conditioning, and in general injury evaluation. For example, U.S. Pat. No. 4,795,351 to Baltimore Therapeutic Equipment Co., Baltimore, Md., describes a stationery device and method which is said to effectively simulate an actual job task, by requiring use of a subject's muscle groups affected by an injury, and record the subject's performance. This type of "real world modeling" is effective in cases where the task to be performed is relatively simple or the duration is comparatively short. The modeling of complex tasks and activities does not conveniently lend itself to "live" reenactment for analysis purposes since the amount of data that must be manually generated to support the analysis necessitates limiting the model to a specific portion of the task. Current modeling techniques are also heavily dependent on the particular subject's strengths, weaknesses, and limitations and consequently do not provide the full scope of an objective evaluation.

Computer simulation has long been a preferred method for analysis of complex event-driven tasks, particularly when resources (time, money, manpower, etc.) are limited. Simulation is broadly defined as the creation of a model which, if subjected to arbitrary stimuli, responds in a similar way to the actual embodiment of a particular physical object or device. More specifically, the term "simulation" is typically used when such a model is implemented as a computer program. Simulation saves a significant amount of time and financial resources because it enables designers to detect design errors and human factors issues well in advance of actual implementation. It saves manpower and allows designers to explore a wider spectrum of potential operational parameters. Moreover, the process of analyzing the simulation itself can be viewed as a phase of development, as the initial general concept of a new manufacturing process slowly evolves into a safe and efficient manufacturing operation.

The primary benefits of modem simulation systems are that they provide an avenue for analyzing complex tasks without requiring the actual performance of the task by a subject or the physical manifestation of a desired workstation. Discrete event simulation represents a physical system as a simulation model having a discrete set of states. Each simulation state is associated with a particular condition of the physical system. A change in the physical state of the modeled system is represented by a transition to a corresponding simulation state. A sequence of these transitions, representing progression of time in the physical system, is accomplished by executing a sequence of functions called events. These events are maintained on a time-ordered list, such that execution of an event causes simulation processing to occur that updates state variables of the system. The depiction of ergonomic movements in this way permits the continuous analysis of a series of contiguous tasks over the duration of the entire work cycle and not just a static evaluation of one portion or time-slice of a task. Understanding the task in its entirety and its impact on the operator yields better information to the human factors engineer since it gives the engineer the opportunity to isolate the specific element of the task that falls outside of acceptable ergonomic boundaries, and alter it just enough to bring the entire task back an within these boundaries.

One drawback of the use of prior art simulation systems is that the development of simulation programs is often time consuming and difficult. In response, software vendors have developed products, called simulation languages, to simplify the task of writing simulation programs. Generally, simulation languages include commonly used components, such as a unit to generate events according to one of several profiles, and provide a convenient way for arranging the components and tailoring them to replicate the business process under consideration. In use, an analyst must select the desired components, arrange the components in a pattern that resembles the business process being analyzed, and supply values tailoring the components to behave like the real process. The result is a "program" in the simulation language. This program is translated into something called an "executable" program consisting of instructions that can be understood by the computer being used. When currently available simulation techniques are used, a new computer simulation program must be constructed each time a process is considered for re-engineering. The time needed to develop and debug a model of a moderately complex process ranges from two man-weeks to two man-months. In addition to creating the model in the simulation language, the human factors engineer must verify that the resulting computer program is free of errors and replicates the behavior of the process. As a result, the total time necessary to develop a useful simulation model is often a barrier to using a simulation model if there is an urgent need to change a business process or model a series of ergonomic movements. Another drawback of the use of traditional simulation systems is that the output from such systems is often too complex for laymen to understand, and very often requires assistance from experts trained in the use of the system. This is particularly true for a system that models the complex movements of the human body as it performs a series of functions.

Therefore, there currently exists a need for combining a discrete simulation system with a graphical user interface (GUI) that permits the conduct of a detailed ergonomic analysis that can be quickly and easily evaluated.

SUMMARY

In accordance with the purpose of the present invention, as embodied and broadly described, the invention provides a method and apparatus for performing discrete simulation of ergonomic movements. The apparatus includes a microprocessor to transform a manually performed process into a sequential listing of events, simulate the process and tabulate the results. In addition to a tabular output of the simulation results, the present system includes a graphical representation of a subject performing the simulated tasks together with color-coded depictions illustrating awkward and overly-demanding body movements. Furthermore, an event detector is provided to detect invalid events that may be simulated during verification of the design. The entire process is performed in a manner that minimizes data transfer time between the simulated model of the process and the ergonomic analysis of the operator portions thereby ensuring that a high level of synchronization is maintained between the simulation of the process and creation of the graphical representation.

Additional advantages, and features of the present invention will further become apparent to persons skilled in the art from the study of the following description and drawings.

DESCRIPTION OF THE DRAWINGS

The accompanying drawings, that are incorporated in and constitute a part of the specification, illustrate presently preferred embodiments of the invention and, together with the general description given above and the detailed description of the preferred embodiments given below, serve to explain the principles of the invention.

FIG. 6 is a tabular listing of valid tasks;

DETAILED DESCRIPTION OF THE INVENTION

In the following detailed description of an embodiment, consistent with the invention, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

Embodiments consistent with the invention, as described herein, are implemented as logical operations in a computing system. The logical operations are implemented: (1) as a sequence of computer implemented steps running on the computing system and (2) as interconnected machine modules within the computing system. The implementation is a matter of choice dependent on the performance requirements of the computing system implementing the invention. Accordingly, the logical operations making up the embodiments described herein are referred to variously as operations, steps, or modules.

The operating environment in which the present invention is used encompasses general distributed computing systems wherein general purpose computers, work stations, or personal computers are connected via communication links of various types. In a client server arrangement, programs and data, many in the form of objects, are made available by various members of the system. The operating environment may alternatively represent a single desktop computer comprised of a plurality of internal microprocessors.

Figure 1:
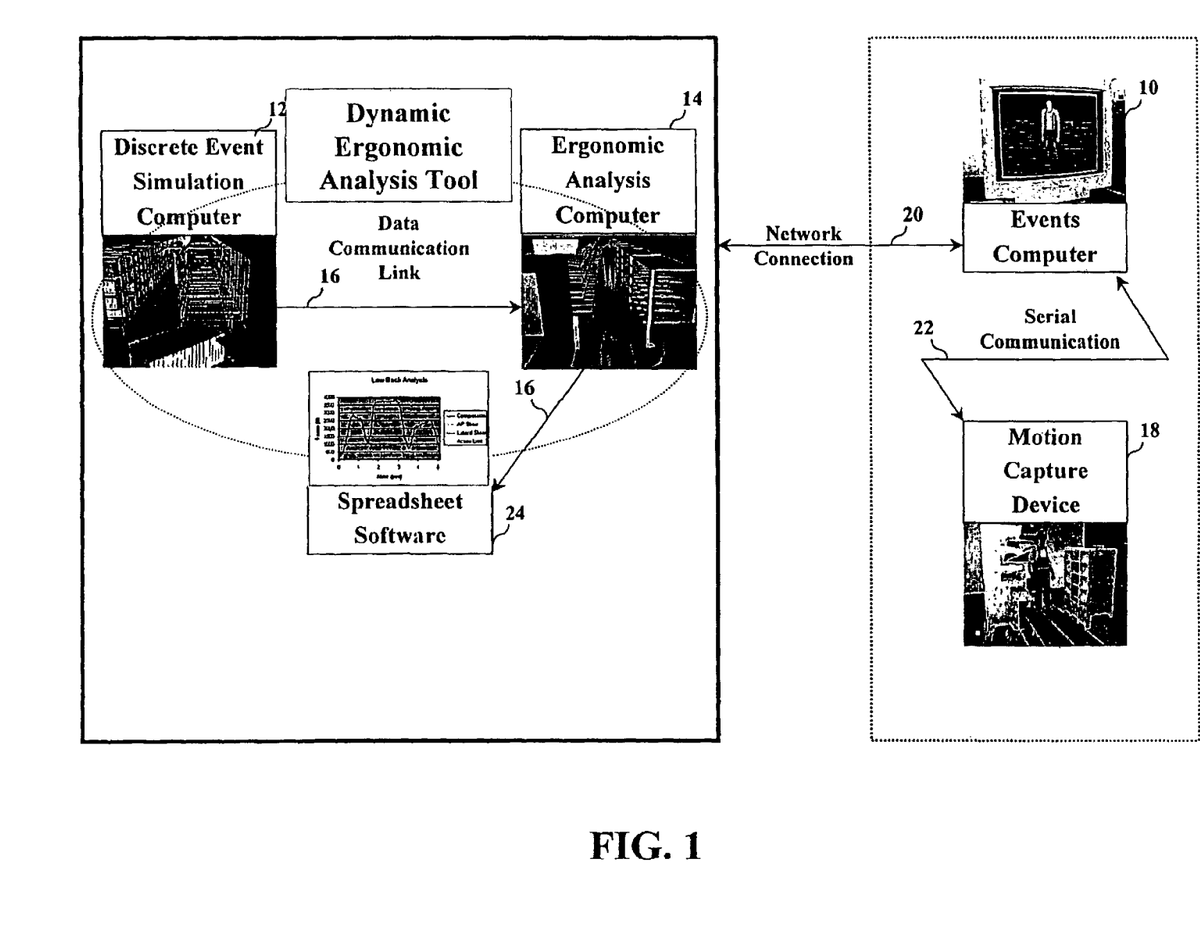
FIG. 1 is a block diagram of a system for performing discrete simulation of ergonomic movements in accordance with the present invention.

Referring now to the drawings, in which like numerals represent like elements throughout the several figures, the present invention will be described. FIG. 1 shows a simulation system 5 comprised of a plurality of interconnected computers and microprocessors hosting a plurality of operating systems. By way of example, the network can be comprised of Pentium™ based microprocessors operating on Windows/NT, UNIX, and/or Windows operating systems. However, the present invention may be embodied on a variety of different platforms, including Macintosh, UNIX, NextStep, MS-DOS, and the like.

Simulation system 5 includes an events computer 10 coupled to a dynamic ergonomics analysis tool (DEAT) 15. A motion capture device 18, as further shown in FIG. 1, may be coupled to events computer 5 via serial communication link 22. DEAT 15 is further comprised of a simulation computer 12, and an ergonomics computer 14 coupled together via data communication link 16. DEAT 15 is also comprised of spreadsheet software 24 that may either be located on ergonomics computer 14 or on another computer system (not shown). Ergonomics computer 14 communicates with spreadsheet software 24 through a system bus (in the event they are located in the same computer) or along data communication link 16 (in the event that spreadsheet software 24 is located on another computer system.) Events computer 10 may be coupled to DEAT 15 through a system bus (in the event they are microprocessors populating a single motherboard) or they may be coupled to each other via a communications link 20 (in the event they are separate computers on a network). Events computer 10, simulation computer 12 and ergonomics computer 14 communicate with each other using a socket layer protocol. The term "sockets" is an application program interface (API) developed for the Berkeley version of AT&T's UNIX® operating system for interconnecting applications running on data processing systems in a network. A socket is used to define an object that identifies a communication endpoint in a network. At least one socket is associated with each computer such that data communication link 16 couples the socket associated with simulation computer 12 to a first socket associated with ergonomics computer 14. Data communication link 16 also couples a second socket associated with ergonomics computer 14 to a socket associated with spreadsheet software 24. Data communication link 20 couples the socket associated with the events computer 10 to a third socket associated with ergonomics computer 14. The sockets are configured such that data entering and exiting the socket always complies with a predetermined format. This provides the capability to use any combination of computers and software components by simply "unplugging" one version and "plugging in" the new version. In this way, events computer 10, simulation computer 12, ergonomics computer 14 and spreadsheet software 24 simply become "black boxes" to the data communication links. In principle, the data communication links 16 and 20 (and all downstream computers/components) need not know or be concerned about the "internals" which operate on the inputs to create the outputs. To activate a connection between computers, a socket in the source computer initiates a connection through the socket programming interface. The necessary data and control information will be handled by the source computer and socket interface. The data is then transmitted over the data communication link to the destination computer thereby establishing a communication link.

Figure 2:
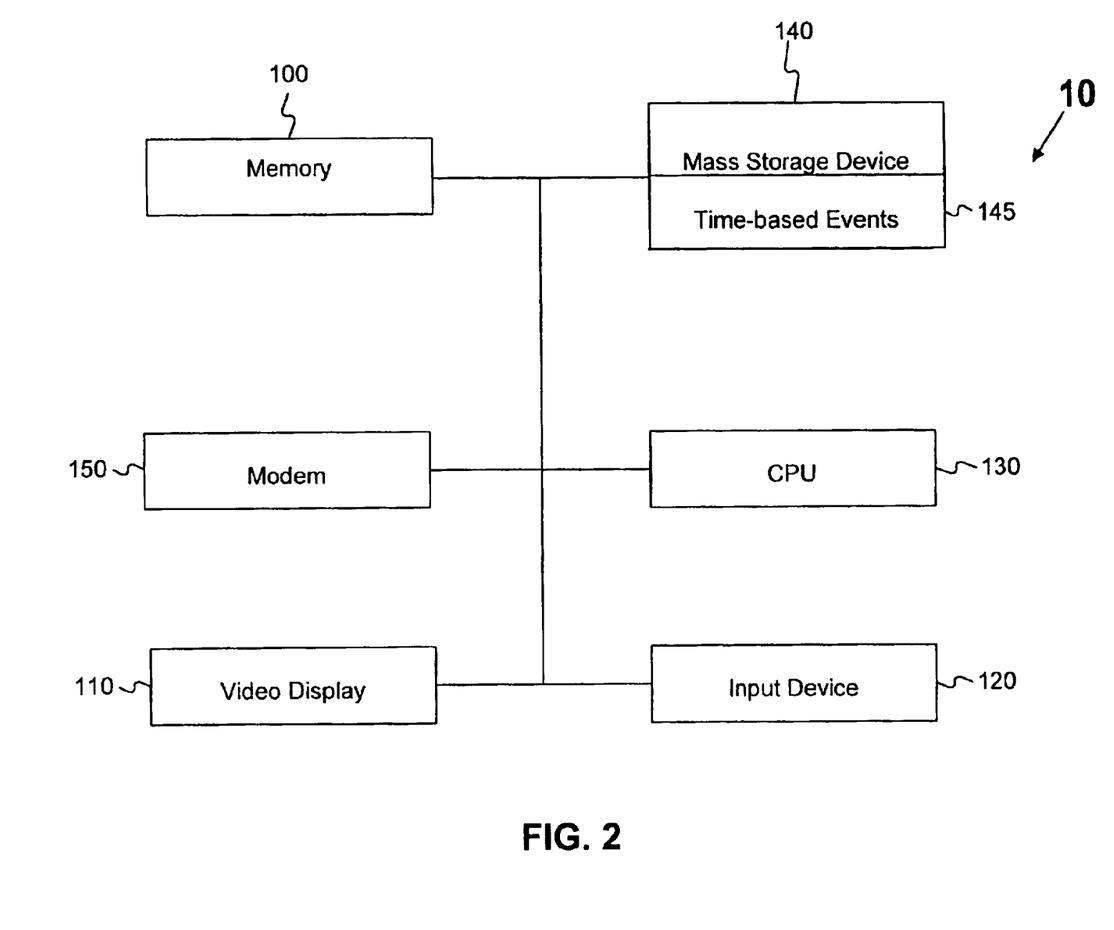
FIG. 2 is a more detailed block diagram of the events computer FIG. 1.

As shown in FIG. 2, events computer 10 preferably includes a main memory 100, an input device 120, a mass storage device 140, and a central processing unit (CPU) 130 for performing various functions related to creation and storage of time-ordered events. Stored on mass storage device is a sequential listing of events 145 that are to be inputted into the events computer 10. These components communicate through a system bus or similar architecture. Additionally, events computer 10 may be connected to an internal or external modem 150 or like device for communication along serial communications link 22 and network connection 20. Alternatively, events computer 10 may be connected via the system bus for communication with DEAT 15 and motion capture device 18. In the case where the events computer 10 is a standalone desktop computer, it will also contain a display device 110 and a keyboard and or mouse for input. There may be other components as well, but these are not shown to facilitate description of the unique aspects of this embodiment of the invention. The hardware arrangement of this computer, as well as the other computers discussed in this specification is intentionally shown as general, and is meant to represent a broad variety of architectures, which depend on the particular computing device used.

Figure 3:
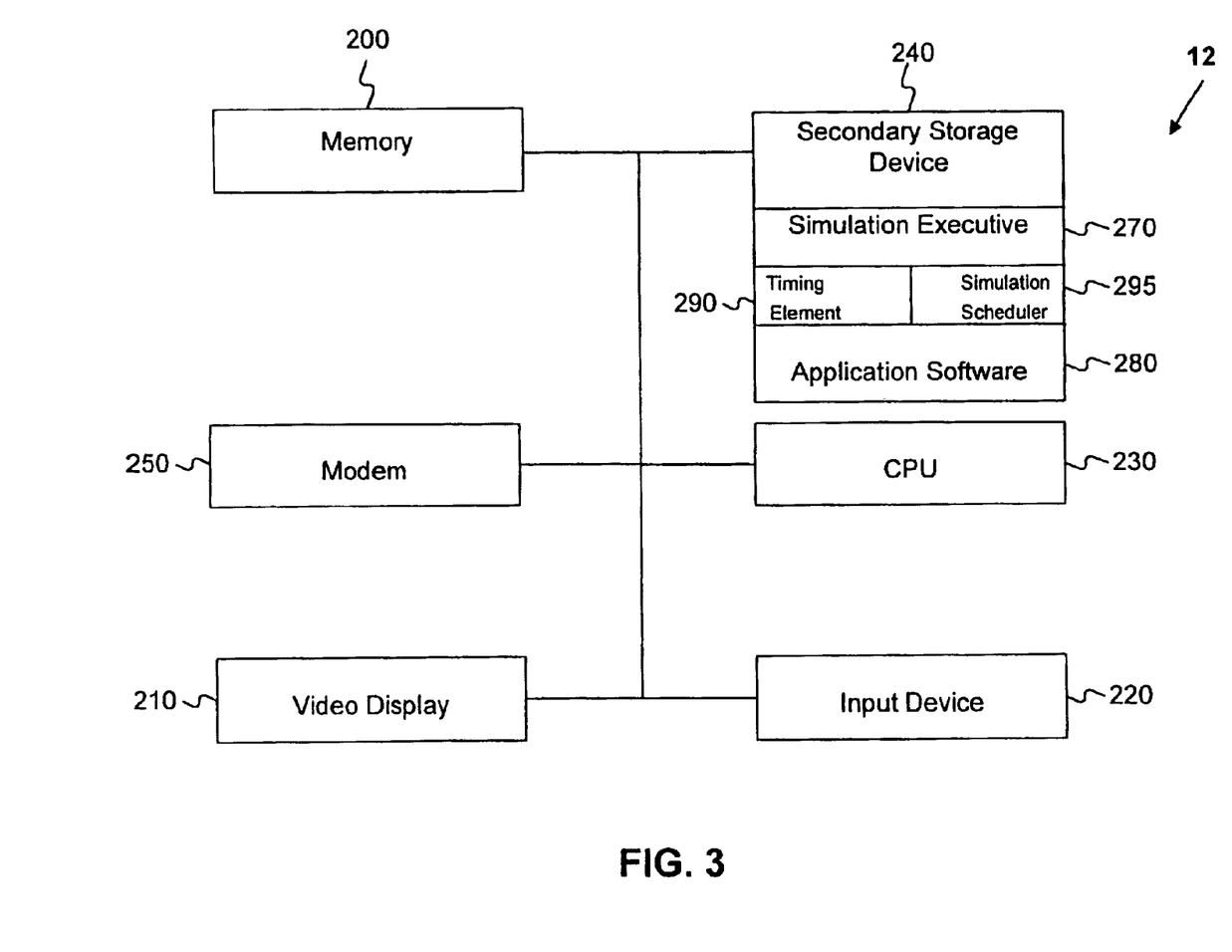
FIG. 3 is a more detailed block diagram of the simulation computer of FIG. 1.

FIG. 3 is a diagrammatic representation of simulation computer 12. As shown in FIG. 3, simulation computer 12 is comprised of a main memory 200, an input device 220, a mass storage device 240, a CPU 230, and an internal or external modem 250. As further shown in FIG. 3, mass storage device 240 maintains a simulation executive 270. The function of simulation executive 270 is to provide a controlling mechanism by which a mixture of application software subsystems 280, constructed as discrete-event simulation components, may be executed with a plurality of computer processors synchronized to simulate a plurality of tasks over a period of time. Application software subsystems 280 consist of a set of one or more processes. Each process or group of related processes incorporates software that simulates some subsystem of the target application. In this context, a process is an independent program, or load module, that is assigned to a processor for execution.

A simulation executive 270 controls the execution dispatch of each process within each subsystem component. Simulation execution proceeds as a succession of discrete events. The time duration between each discrete event varies as a function of the events being executed and may vary widely during execution of the simulation. An important aspect of this simulation tool is that it aligns, whenever possible, discrete event cycle times to coincide with ergonomic software processing times, so that information passed between the two systems within the simulation is synchronized, coherent and timely. Major software components of the executive as shown in FIG. 3 include a timing element 290 and a simulation scheduler 295. Timing element 290 maintains system mode and time, and provides overall execution control of the simulation subsystem components. Simulation scheduler 295, on the other hand, is the master scheduler for each simulation cycle. As in the case of events computer 10, simulation computer 12 may also be comprised of a display device 210.

Figure 4:
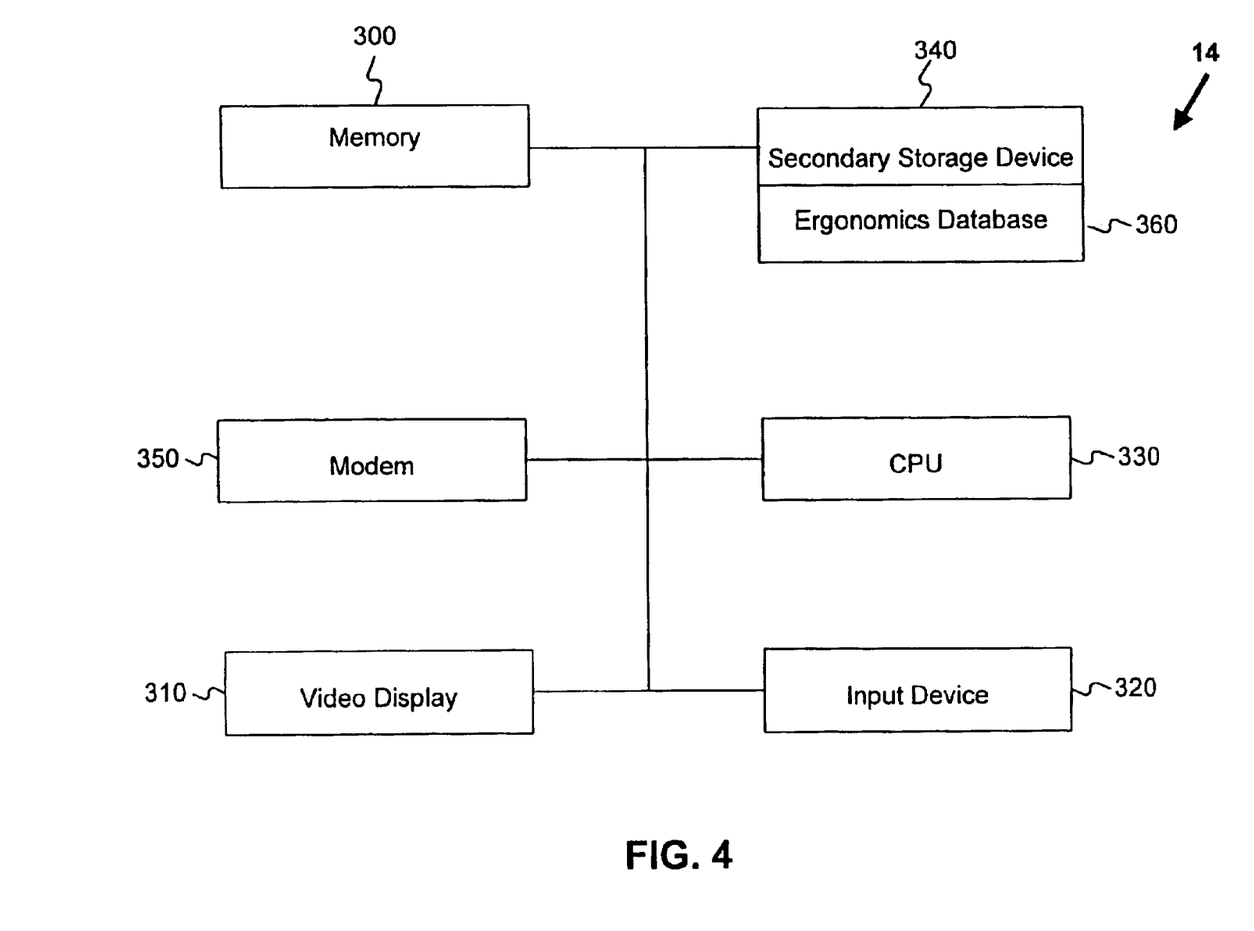
FIG. 4 is a more detailed block diagram of the ergonomics computer of FIG. 1.

FIG. 4 is a diagrammatic representation of ergonomics computer 14 in accordance with the present invention. As shown in FIG. 4, ergonomics computer 14 is comprised of a main memory 300, a video display 310, an input device 320, a mass storage device 340, a CPU 330 and an internal or external modem 350. Memory 300 additionally contains software for providing a graphical image display of the simulation on display 310. As further shown in FIG. 3, secondary storage device 340 maintains an ergonomics database 360. At a minimum, ergonomics computer 14 will measure: strength and posture; energy expenditure/metabolic rate (GARG); National Institute for Occupational Safety and Health (NIOSH) lifting index; back compressive forces; and the frequency of certain repetitive tasks.

Events computer 10, simulation computer 12, and ergonomics computer 14 shown in FIG. 1 independently run interrelated software programs and function as a group to process a simulation in accordance with the present invention. Although the present invention may be utilized to model and analyze a wide variety of tasks, including processes, product design, and manufacturing techniques, the term "simulation" will be used to generally describe the model for a manually fed and swept Delivery Bar Code Sorter (DBCS). The DBCS is a letter sorting device used by the U.S. Postal Service. It is usually staffed by two operators. Limiting the description to the DBCS is being done for the sake of brevity, and should not be construed to limit the scope of the present invention.

It is therefore understood from the schematic overview illustrated by FIG. 1 and the detailed schematics of FIGS. 24 that the present invention, when properly configured, may be employed in a distributed computer environment to model any series of complex ergonomic tasks. The next portion of this disclosure illustrates the actual operation of the subject invention through a series of detailed flow charts.

Figure 5:
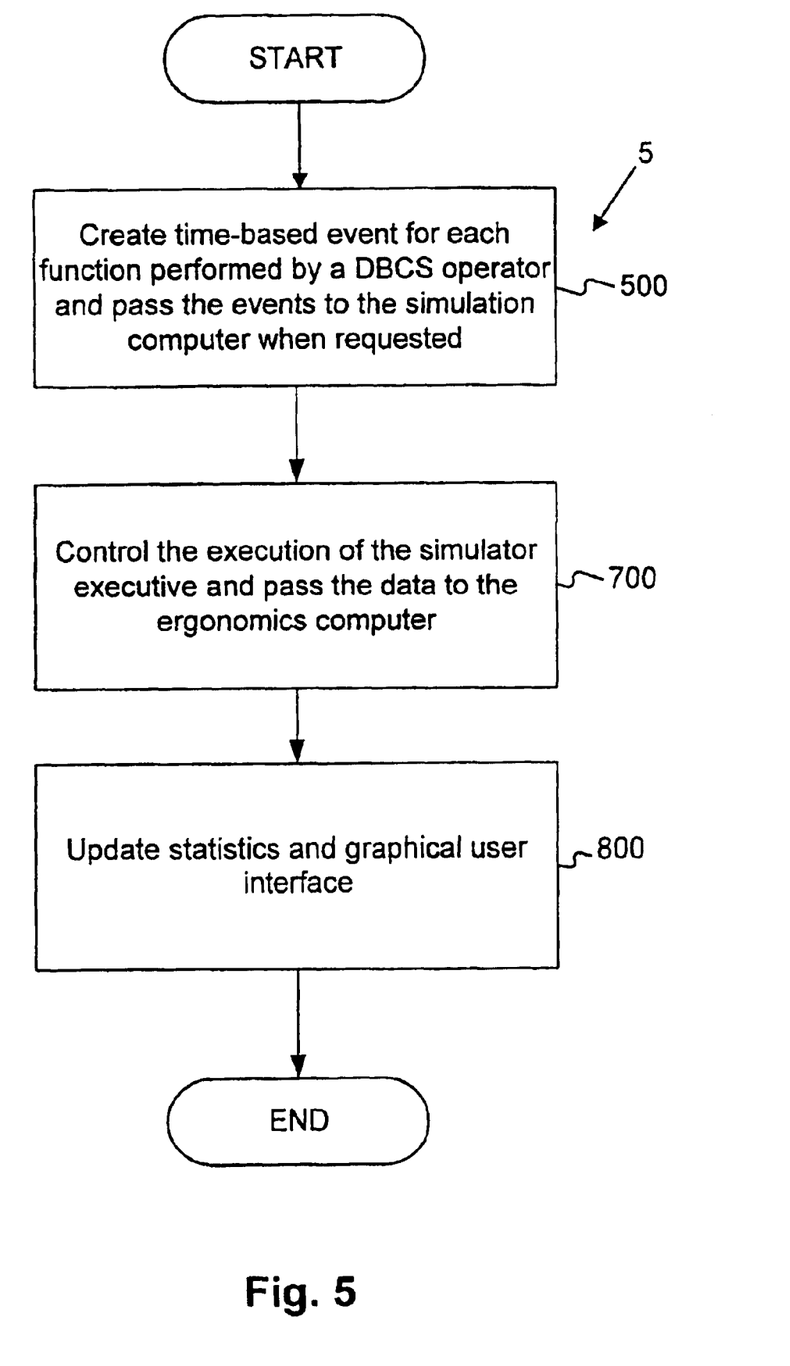
FIG. 5 is a flow chart of the system for performing discrete simulation of ergonomic movements of the present invention.

As shown in FIG. 5, events computer 10 in step 500 first creates sequential listing of events of the functions performed by a typical DBCS operator. The events can either be automatically simulated by events computer 10 and then stored in memory 100 or a human subject equipped with an appropriate motion capture device 18 may manually perform the various functions or events and have them passed to events computer lo by the motion capture device 18 over a serial communication link 22 for storage in memory 100. Examples of the various events include: walk to a bin, raise arms, grasp drawer, pull out drawer, etc.

FIG. 6 shows a tabular listing of the task descriptions including task# 600, description 610, category 620, detail 630, time 650, etc. As shown, each description 610 summarizes the task to be performed by the subject, category 620 explains the function performed during the task (e.g., lifting, lowering, push, pull, etc.) Detail 630 further provides insight into the task performed. For example, description 610 states that the subject "reaches to a drawer," category 620 explains that the task involves lateral arm work, and detail 630 further provides that the subject is standing and twisting at a 90° angle. These descriptions 610 actually represent portions of actual job functions (e.g., sweeping a bin) performed by a DBCS operator. In other words, the job function of sweeping bin #4 may include the following tasks: walking 10 seconds to the bin, raising your arms, reaching for the drawer, grasping the drawer, pulling the drawer out, etc. The job function of sweeping bin #10 may be identical except for the fact that the subject must walk farther or reach higher/lower. Once the events computer 10 creates the tasks, the ergonomic computer 14 "packetizes" the tasks into job function libraries for later retrieval during the actual simulation. That is, when simulation computer 12 passes an event (e.g., bin #4 is full) to ergonomic computer 14, ergonomic computer 14 retrieves the packet of tasks associated with emptying the bin and processes them accordingly.

Simulation computer 12 has been programmed to model the workflow at a typical DBCS. In other words, simulation computer 12 "knows" which drawers or bins fill up and how often they fill up over a period of time for a particular processing location. When the simulation system 5 is run, simulation computer in step 700 passes time-based events to ergonomics computer 14 along data communication link 16. The time-based events may be the status (e.g., ½ full, ¾ full, 100% full, etc.) of one or more trays, drawers and racks. Ergonomics computer 14 identifies the tasks associated with each time-based event and then updates the report statistics in spreadsheet software 24 and graphical image display operating on display 310 accordingly. While FIG. 5 simply shows the process executing a single time, it is understood by those skilled in the art that the process can be recursive.

Figure 7:
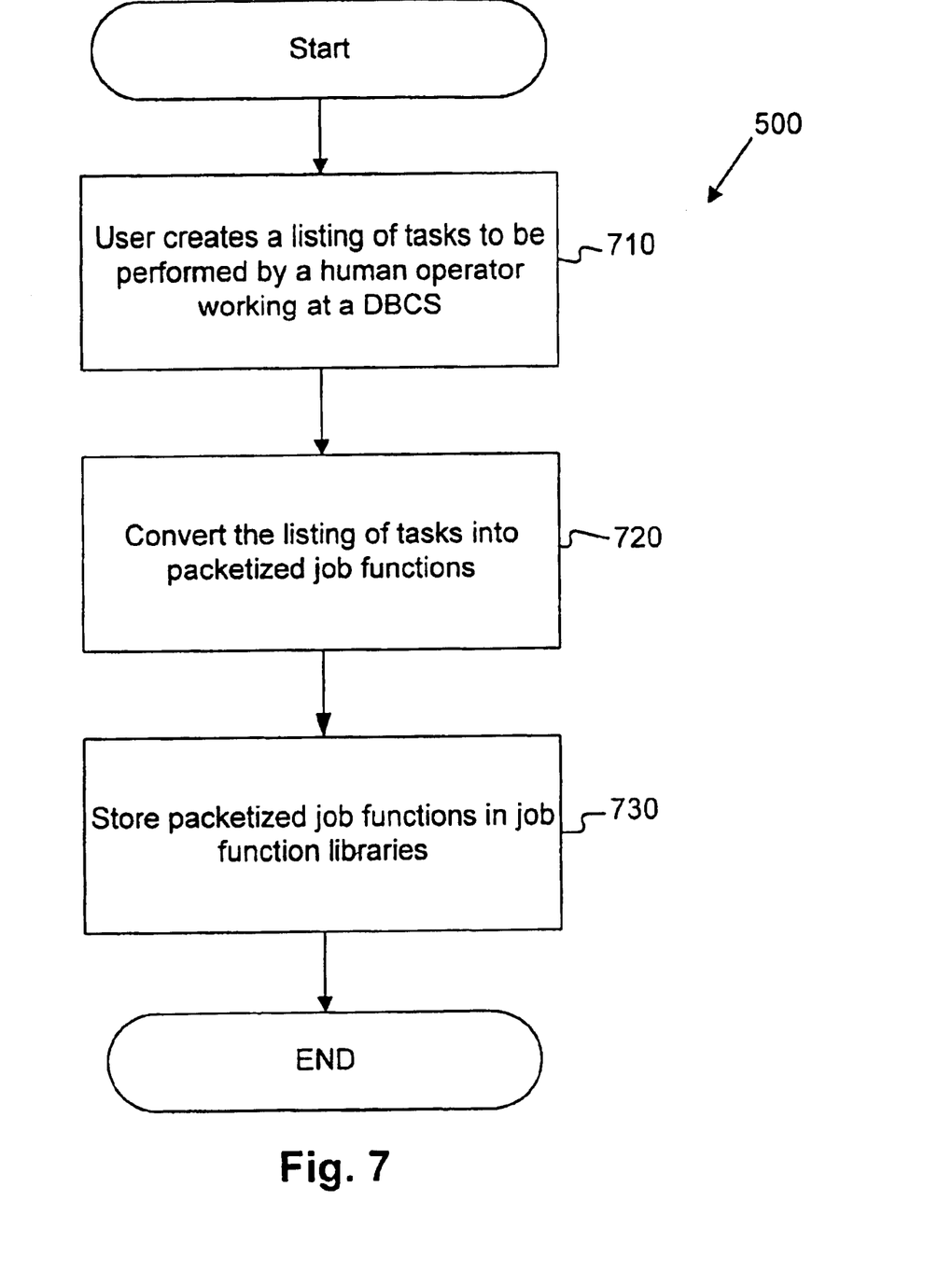
FIG. 7 is a flow chart of the processing performed by the events computer.

As shown in FIG. 7, the simulation process begins when a user creates a listing of the actual tasks to be performed by a human operator working at a DBCS (step 710). This process is performed in the present system through the use of multiple human models of the human stature with sensors attached to defined locations on the body. (note: this description repeatedly refers to human models in the 95$^{th}$ percentile—5$^{th}$ percentile. This is for the sake of brevity and should not be construed to limit the scope of the present invention.) The human model then goes through the desired motion as events computer 10 captures the model's physical movements at up to 30 times a second. The model can either be located in an actual workplace or in a full scale mock-up environment. In addition to performing valid operations, the human model may perform correct and incorrect equipment operations for analysis. It is however important that the environment include all the elements of the real world workplace that will limit or otherwise inhibit operator movement during the performance of the specific task. The list includes the period of time necessary to perform the task, interrelationships between the tasks as well as a frequency with which the task is performed. While this specification discloses a process of creating events wherein a user manually creates a listing of events (either through manually entering data into events computer 10, or via the use of motion capture device 18), it is important to note that events computer 10 may automatically create a listing of events through the use of an event generator routine stored in memory 100. Once the listing is complete, events computer 10 passes the time-based events to ergonomics computer 14 so that the events can be packetized into actual job functions and stored in memory 300 (step 720). The packetized job functions are then stored in job function libraries in memory 300 for later retrieval.

Figure 8:
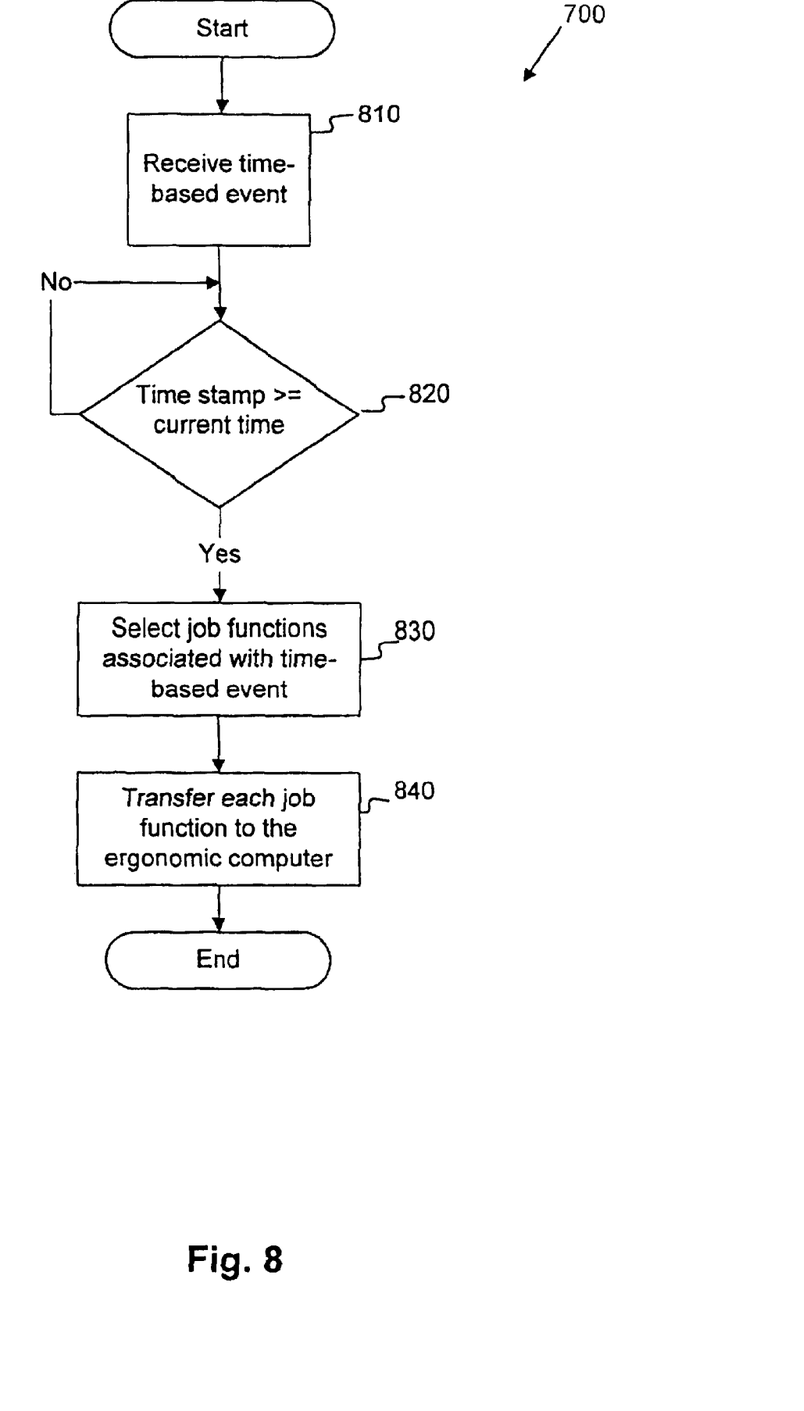
FIG. 8 is a flow chart of the processing performed by the simulation computer.

FIG. 8 shows a flowchart depicting the software process performed by simulation computer 12 after ergonomic computer 14 has stored packetized events into memory 300 for later retrieval. First, as shown in step 810, simulation computer 12 determines that a particular time-based event has occurred. For example, simulation computer 12 may determine that a particular bin or tray has recently filled up. Next, in step 820, timing element 290 compares the current time to the time stamp associated with the time-based event. If the current time is less than the associated time stamp, simulation computer 12 waits until the current time is equal to the associated time stamp. When the current time equals the associated time stamp, simulation scheduler 295 selects the job function to be executed to accomplish the time-based event (step 830), and then transfers the job function to ergonomics computer 14 (step 840). For example, a time-based event may be "sweep bin #4." In addition to transferring the job function associated with each time-based event to the ergonomics computer 14, simulation computer 12 may also transmit the following data: hand location(s) (e.g., horizontal distance, vertical distance, and lateral distance (how far apart are hands)); weight of package or tray; task type; frequency; force (for pushing and pulling activities); force direction; posture; starting position (location coordinates); ending position (location coordinates); time stamp of events; size of package or tray; asymmetry of object (at the origin and destination); duration; and coupling (quality of hand so to object, i.e., handle, and grip). After the job function with its associated data has been transferred to ergonomics computer 14, the process flows to step 800 (FIG. 5).

Figure 9:
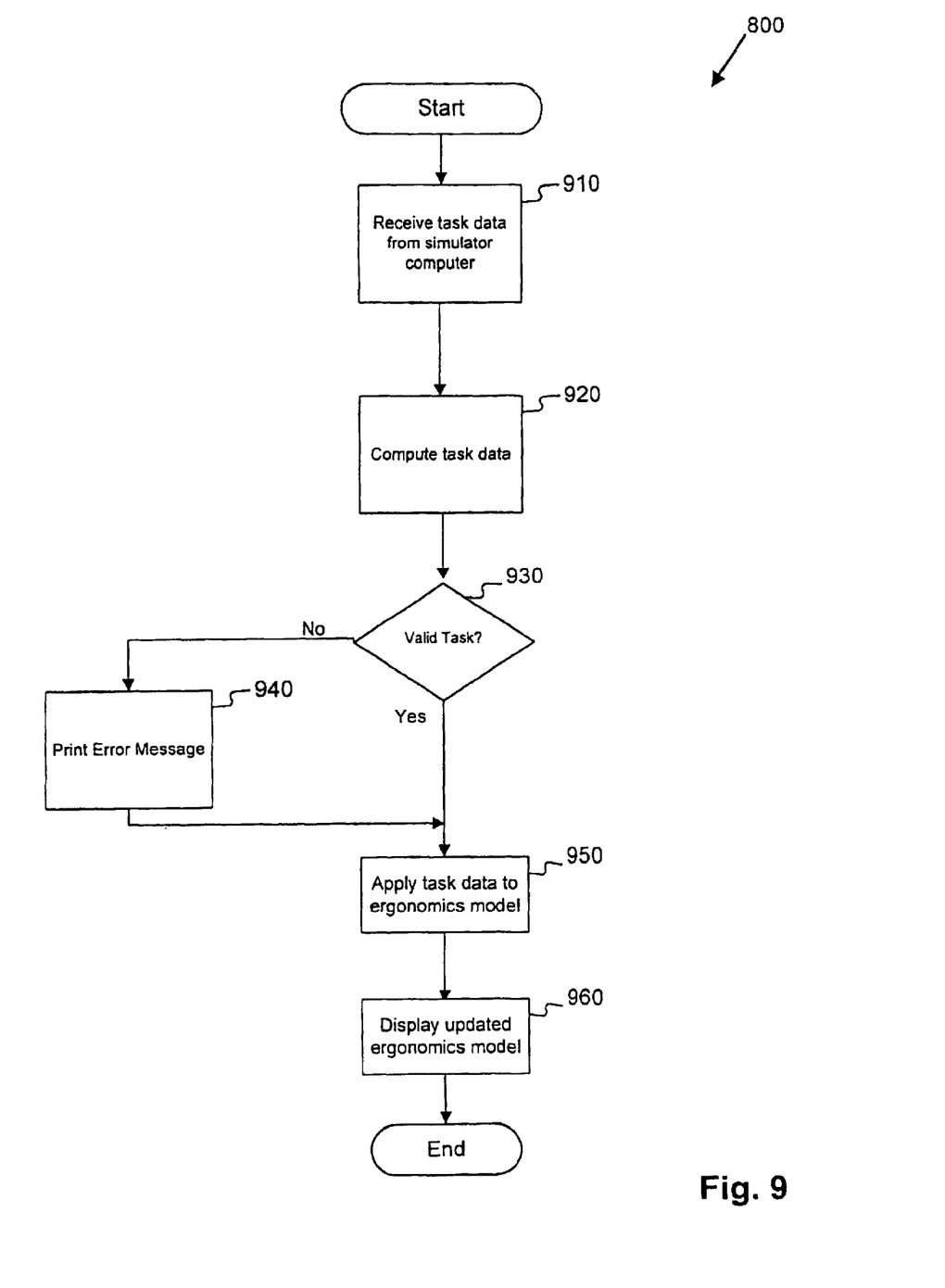
FIG. 9 is a flow chart of the processing performed by the ergonomic computer.

FIG. 9 shows a flowchart depicting the software process performed by ergonomics computer 14 after simulation computer 12 transmits a job function with its associated data to ergonomics computer 14. First, as shown in step 910, ergonomics computer 14 receives the job function with its associated data. For example, in the case of the above times-based event (i.e., sweep bin #4), the tasks associated with it may be: Processes associated with that event may be: (1) walk 40 feet; (2) turn 90° to the left; (3) extend arms 90°; (4) grasp the tray; (5) pull tray out; (6) release tray; (7) reach for drawer; (8) pull drawer out; (9) release drawer; (10) reach to DBCS; (11) grasp letters; (12) move letters to 1226F rack; etc. When ergonomics computer 14 receives a job function, it computes new task data to reflect the simulated operator's performance of the particular job function in step 920. In essence, if the job function requires the simulated operator to turn its head 45° to the left, ergonomics computer 14 will determine the current location of the operator's head and adjust the value accordingly to reflect execution of the task. Next, ergonomics computer 14 ascertains whether performance of the current task is a valid operation in step 930. For example, ergonomics computer 14 ensures that a simulated human subject is not asked to perform impossible or at least, ill-advised tasks. An impossible task may be one that places an undue risk of injury on the human subject, or one that requires the subject to place itself in an improper body position to perform the specific task. An impossible task may also require the subject to perform excessive bending, or utilize improper techniques for heavy lifting, etc. If the task is not valid, process execution flows to step 940 and a message is printed out to spreadsheet software 24, informing the user that high risk operation was attempted to be performed and the process continues. The system may alternatively provide for manual selection by a user to resolve the unsafe element of the activity or it may automatically resolve the conflict and simply inform the user, after the fact. Next, ergonomics computer 14 analyzes the data and updates ergonomics database (step 950). To perform the analysis, ergonomics computer 14 accesses at least the following: spinal compressive force estimation model(s); joint strength prediction model(s); a variety of databases containing anthropometric parameters consisting of physiological measurements for people in the 5th to 95th percentile to include various population groupings of the U.S., Japanese, European, etc.; NIOSH lifting guidelines; push/pull guidelines; upper extremity evaluation model; metabolic model; and cycle determination/frequency counts. Ergonomics database will track: frequency (i.e., number of lifts over a period of time); percent of time walking vs. percent of time performing bends, lifts, etc.; time a package arrives and its bin location; size of the package or tray; weight of the package or tray; starting position coordinates of the package or tray; and ending position coordinates of the package or tray. In step 960, ergonomic computer 14 updates the graphical representation of the simulation on display 310. At a minimum, ergonomic computer 14 will provide dynamic graphing of the following: posture/balance=acceptable/non-acceptable; back compression design limit vs. back compression upper limit; static strength; spinal forces; fatigue/recovery time, etc. The ergonomic computer performs this series of tasks 910–960 for each retrieved job function. It additionally performs several background tasks (e.g., memory management, data sharing, etc.) as necessary. When the complete series of job functions have been performed and the database updated, ergonomic computer 14 outputs an analysis listing of the simulation.

From the foregoing description, it will be appreciated that the present invention provides an efficient system and method for coupling a simulation system with a graphical user interface, so that a designer can quickly and easily determine whether newly defined or pre-existing tasks conform to ergonomic guidelines which would reduce exposure of workers to risk of injury. Also, it will be appreciated that the present invention is capable of evaluating in real-time and determining the exact moment when specific tasks exert excessive force on a worker's body, exceeding NIOSH recommended force limits. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; a data connection to/from the Internet; or other forms of RAM or ROM. Similarly, the method of the present invention may conveniently be implemented in program modules that are based upon the flow charts in FIGS. 5–8. No particular programming language has been indicated in the present description for carrying out the various procedures described above because it is considered that the operations, steps and procedures described above and illustrated in the accompanying drawings are sufficiently disclosed to permit one of ordinary skill in the art to practice the present invention. Moreover, there are many computers and operating systems which may be used in practicing the instant invention and therefore no detailed computer program could be provided which would be applicable to these many different systems. Each user of a particular computer will be aware of the language and tools which are most useful for that usees needs and purposes.

Alternative embodiments will become apparent to those skilled in the art to which the present invention pertains without departing from its spirit and scope. Accordingly, the scope of the present invention is defined by the appended claims rather than the foregoing description.

What is claimed is:

1. An apparatus for conducting an ergonomic analysis of a physical activity performed by a user, comprising:
   a first database comprising a plurality of job functions performed by a human operator at a workstation, each of said job functions comprising at least one movement of a specific part of said user's body during performance of said job function;
   a first computer that generates a time-based event, said time-based event corresponding to an observable current at said workstation;
   a second computer that:
      receives said time-based event;
      determines a job function associated with said time-based event;
      retrieves said job function from said first database;
      determines a level of physiological exertion necessary to perform said time-based event; and
      creates a graphical representation to reflect the performance of said time-based event; and
   a data communication link coupling said first and second computers, wherein said data communication link automatically establishes a communication protocol between said first and second computers thereby permitting different versions of said first and second computers to be seamlessly appended without modification.

2. The apparatus of claim 1 wherein said step of determining a level of physiological exertion further comprises the step of determining a level of physiological exertion for at least one anthropometric parameter.

3. The apparatus of claim 2 wherein said anthropometric parameters correspond to physiological measurements for people in the $5^{th}$–$95^{th}$ percentile of a target population.

4. A method for performing an ergonomic analysis of a physical activity performed by a user, comprising:
   capturing a user's initial body position;
   measuring at least one change in said user's initial body position as the user performs a physical activity;
   determining a level of physiological exertion necessary to perform said at least one change;
   displaying a graphical representation of said at least one change, said graphical representation comprising an electronic image of said user at a workstation;
   simulating performance of said physical activity over time; and
   using the simulated performance to calculate the associated physiological exertion level as a function of time to create an ergonomic analysis of the physical activity.

5. The method of claim 4 wherein said step of determining a level of physiological exertion further comprises the step of determining a level of physiological exertion for at least one of a plurality of anthropometric parameters.

6. The method of claim 5 wherein said anthropometric parameters correspond to physiological measurements for people in the $5^{th}$–$9^{th}$ percentile of a target population.

7. The method of claim 4 wherein the step of determining a level of physiological exertion comprises the step of determining at least one of strength and posture, energy expenditure/metabolic rate (GARG), NIOSH lifting index, back compressive forces and the frequency of selected tasks.

8. The method of claim 4 wherein the step of determining a level of physiological exertion comprises the step of determining whether an event is incompatible with desired performance by a human subject to perform.

9. The method of claim 4 wherein the step of displaying a graphical representation includes graphically displaying changes in at least one of a user's posture/balance, back compression design limits, back compression upper limits, NIOSH lifting index, metabolic/energy expenditure with work/rest recommendations, fields of vision/interferences, and obstruction/reach envelopes on a display monitor.

10. An apparatus for ergonomic analysis of a physical activity performed by a user during performance of a series of tasks using discrete event simulation, comprising:
    means for capturing a user's initial body position;
    means for measuring at least one change in said users initial body position as the user performs a physical activity;
    means for determining a level of physiological exertion necessary to perform said at least one change;
    means for displaying a graphical representation of said at least one change, said graphical representation comprising an electronic image of said user at a workstation;
    means for simulating performance of said physical activity over time; and
    means for using the simulated performance to calculate the associated physiological exertion level as a function of time to create an ergonomic analysis of the physical activity.

11. A computer program product having computer readable instructions for performing an ergonomic analysis of a physical activity performed by a user, the computer program product comprising:
    a module configured to capture a user's initial body position;
    a module configured to measure at least one change in said user's initial body position as the user performs a physical activity;
    a module configured to determine a level of physiological exertion necessary to perform said at least one change;
    a module configured to display a graphical representation of said at least one change, said graphical representation comprising an electronic image of said user at a workstation;
    a module configured to simulate performance of said physical activity over time; and
    a module configured to use the simulated performance to calculate the associated physiological exertion level as a function of time to create an ergonomic analysis of the physical activity.

12. The computer program product of claim 11, wherein the module configured to determine a level of physiological exertion includes a module configured to determine at least one of strength and posture, energy expenditure/metabolic rate (GARG), NIOSH lifting index, back compressive forces, and the frequency of selected tasks.

13. The computer program product of claim 11, wherein the module configured to determine a level of physiological exertion includes a module configured to determine whether an event is incompatible with desired performance by a human subject to perform.

14. The computer program product of claim 11, wherein the module configured to construct a graphical representation of the image exertion includes a module configured to graph at least one of a user's posture/balance, back compression design limits, back compression upper limits, NIOSH lifting index, metabolic/energy expenditure with work/rest recommendations, fields of vision/interferences, and obstruction/reach envelopes.

15. An apparatus for conducting an ergonomic analysis of a physical activity performed by a user, comprising:
    a first computer that captures movements performed by a human operator at a workstation and creates a database of job functions from said movements;
    a second computer that generates a time-based event, said time-based event corresponding to an observable occurrence at said workstation;
    a third computer that:
        receives said time-based event;
        determines a job function associated with said time-based event;
        retrieves said job function from said database;
        determines a level of physiological exertion necessary to perform said time-based event; and
        creates a graphical representation to reflect the performance of said time-based event; and
    a data communication link coupling said first, second and third computers, wherein said data communication link automatically establishes a communication protocol between said first, second and third computers thereby permitting different versions of said first, second and third computers to be seamlessly appended without modification.

16. The apparatus of claim 15 wherein said step of determining a level of physiological exertion further comprises the step of determining a level of physiological exertion for at least one of a plurality of anthropometric parameters.

17. The apparatus of claim 16 wherein said anthropometric parameters correspond to physiological measurements for people in the $5^{th}$–$95^{th}$ percentile of a target population.

* * * * *

UNITED STATES PATENT AND TRADEMARK OFFICE
CERTIFICATE OF CORRECTION

PATENT NO. : 6,963,827 B1
DATED : November 8, 2005
INVENTOR(S) : Larry L. Elyea et al It is certified that error appears in the above-identified patent and that said Letters Patent is hereby corrected as shown below:

Column 11,
Line 14, "users" should read -- user's --.

Signed and Sealed this

Seventeenth Day of January, 2006

JON W. DUDAS
*Director of the United States Patent and Trademark Office*